United States Patent [19]

Kooroki

[11] Patent Number: 4,579,355
[45] Date of Patent: Apr. 1, 1986

[54] NITRIDED STEEL PISTON RING WITH OXIDE FILM

[75] Inventor: Takeo Kooroki, Tokyo, Japan

[73] Assignee: Nippon Piston Ring Co., Ltd., Tokyo, Japan

[21] Appl. No.: 693,887

[22] Filed: Jan. 23, 1985

[30] Foreign Application Priority Data

Jan. 23, 1984 [JP] Japan .................................. 59-8586

[51] Int. Cl.⁴ ............................ F16J 9/00; F02F 5/00
[52] U.S. Cl. .................................. 277/216; 277/224; 277/235 A
[58] Field of Search ................... 277/1, 216, 223, 224, 277/234, 235 R, 235 A, 236, DIG. 6; 29/156.6, 156.63; 75/244, 245, 126 J; 148/12 R, 15.5, 16.6

[56] References Cited

U.S. PATENT DOCUMENTS

| | | | |
|---|---|---|---|
| 2,905,512 | 9/1959 | Anderson | 277/224 X |
| 3,900,200 | 8/1975 | Nakamura | 277/235 A |
| 4,077,637 | 3/1978 | Hyde et al. | 277/235 A |
| 4,106,782 | 8/1978 | Hyde et al. | 277/235 A |
| 4,407,515 | 10/1983 | Naito | 277/235 A X |

FOREIGN PATENT DOCUMENTS

| | | | |
|---|---|---|---|
| 1195110 | 6/1965 | Fed. Rep. of Germany | 277/224 |
| 2934027 | 4/1980 | Fed. Rep. of Germany | 277/224 |
| 218164 | 3/1942 | Switzerland | 277/235 A |
| 662213 | 12/1951 | United Kingdom | 277/235 A |

OTHER PUBLICATIONS

*The Iron Age,* "Case Hardening with Nitrides," Aug. 5, 1926, pp. 340 and 341.

*Primary Examiner*—Robert S. Ward
*Attorney, Agent, or Firm*—Finnegan, Henderson, Farabow, Garrett & Dunner

[57] ABSTRACT

A steel piston ring comprises a base material of stainless steel, a nitrided layer covering at least the edge of the ring adapted to slide along a cylinder wall of an internal combustion engine, and an oxide film over the nitrided layer on the edge of the ring. Suitable oxide films include phosphate oxide and triion tetroxide.

8 Claims, 2 Drawing Figures

A   B   C

NITRIDED STEEL PISTON RING WITH OXIDE FILM

FIELD OF THE INVENTION

This invention relates to piston rings for internal combustion engines, and more particularly to an improvement of a gas seal piston ring which is used under severe conditions such as high temperature, high load and high corrosions such as high temperature, high load and high corrosion in a diesel engine or a high lead gasoline engine.

BACKGROUND OF THE INVENTION

Piston rings for internal combustion engines should have a gas sealing function and a lubricant controlling function. Therefore, in general, two piston rings for gas seal and one piston ring for lubricant control are used in combination. Of these piston rings, the gas seal piston ring is greatly affected by combustion gas because it is arranged immediately below the top land of the piston. More specifically, the gas seal piston ring is strongly pushed against the cylinder liner wall not only by its own tension but also by the gas pressure applied to the upper surface and the inner cylindrical wall of the piston ring, thus providing a great frictional force.

An abnormal wearing phenomenon called "scuffing" is liable to take place with the gas seal piston ring to which lubricant is sparingly supplied. Such a gas seal piston ring is, in general, made of cast iron, and has its outer peripheral surface plated with chrominum in order to improve the wear resistance. It suffers from the difficulty that when it is used under severe conditions such as high temperature, high load, and high corrosion in a diesel engine or a high lead gasoline engine, the chromium deposition on the outer peripheral surface of the piston ring peels off due to fatigue, becomes corroded, or is worn out. In some cases the entire ring is thermally collapsed.

Japanese Patent Application Laid-Open No. 203848/1982, proposes a steel gas seal piston ring having a soft nitrided layer on its surface which is suitable for use under severe conditions. The steel gas seal piston ring is advantageous in several points; that is, it is high in thermal collapse resistance, corrosion resistance, and wear resistance. It has been found that the piston ring is still disadvantageous, however, because its surface roughness is large and it does not conform well to the cylinder during initial operation. Accordingly, scuffing is liable to take place.

OBJECTS AND SUMMARY OF THE INVENTION

In view of the foregoing, an object of the present invention is a piston ring that is resistant to corrosion and wear.

Another object of the present invention is a piston ring that operates satisfactorily under severe conditions such as high temperature and high load.

Still another object of the present invention is a piston ring that does not scuff cylinder linings during initial and subsequent operation.

These and other objects are achieved by a piston ring for use in a cylinder of an initial combustion engine, comprising a base ring including an exterior ed-e adapted to slide along the wall of the cylinder, a ni- trided layer formed in the exterior edge, and an oxide film formed over the nitrided layer.

BRIEF DESCRIPTION OF THE DRAWINGS

The manner by which these and other objects, feature, and advantages of the present invention are achieved will become more apparent from the following detailed description when considered in the light of the following drawings, wherein.

DETAILED DESCRIPTION

One embodiment of the present invention will be described with reference to the accompanying drawings.

Figure 1:
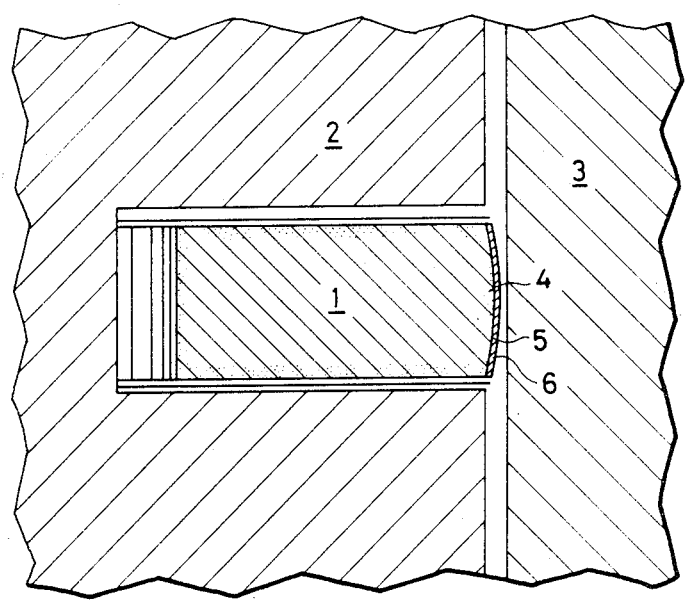
FIG. 1 is a sectional view of a piston ring according to the present invention.

FIG. 1 shows a gas seal piston ring 1 according to the present invention which is fitted in a piston 2. The piston ring 1 is made of stainless steel which shows a corrosion resistance, a thermal collapse resistance, and is suitable for a variety of surface treatments.

First, a nitrided layer 4 as formed in at bast the surface of the outer peripheral surface 6 that is slid within a cylinder 3. As a result, the piston ring 1 has high wear resistance. Moreover, a gas seal piston ring of steel can be put in practical use instead of a conventional gas seal piston ring of cast iron. The nitrided layer 4 may be formed by any conventional nitriding method such as a gas nitriding method, a salt bath nitriding method, or an ion nitriding method.

Of the nitrided layers thus formed, at least the one-formed in the outer peripheral surface of the piston ring is subjected to a chemical conversion treatment to for an oxide film 5 therein. This treatment is essential in the invention. Examples of the oxide film are phosphate films such as a manganese phosphate film and a zinc phospnate film, and a triion tetroxide film. The oxide film 5 is sufficiently soft to conform to the cylinder during intial operation. This prevents the initial scuffing phenomeon. Furthermore, the oxide film 5 is excellent in corrosion resistance.

Figure 2:
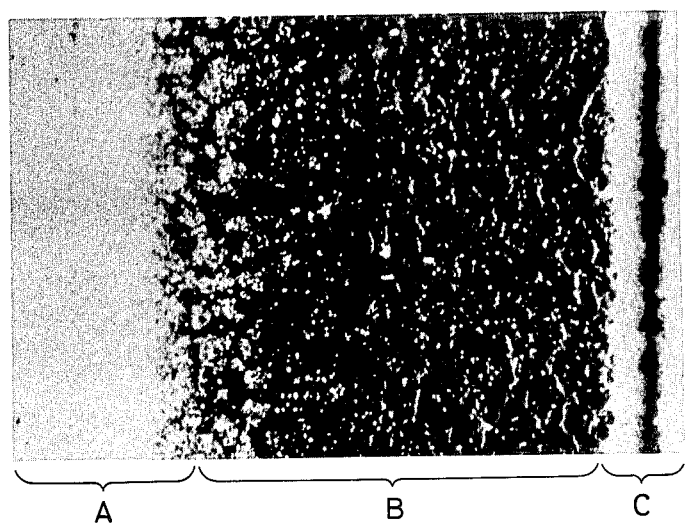
FIG. 2 is an enlarged photograph showing a section of a piston ring according to the present invention wherein the base material thereof has been nitrided.

The oxide film 5 may be formed after the compound layer, that forms the outermost part of tne nitrided layer has been removed. As shown in FIG. 2, which is a picture showing a section of the nitrided surface layer enlarged by the factor of 600, the nitrided layer 4 is made up of a diffusion layer B whose hardness is higher that that of the base material. A because nitrogen has been diffused and permeated therein, and a compound layer C the hardness of which is higher than that of the diffusion layer B and in which iron nitride has been formed. The compound layer C appears as a white portion. In the case where the hardness of the nitride layer is excessively high, the oxide film may be formed after the compound layer C has been removed to expose the diffusion layer B and to prevent the occurrence of the scuffing phenomenon.

However, it should be noted that the oxide film can be readily formed when the compound layer C exists. Therefore, when it is required to utilize this advantage, the compound layer C should not be removed.

As is apparent from the above description, in the piston ring of the present invention, a base material of stainless steel is subjected to nitriding. Accordingly, the piston ring is excellent in thermal collapse resistance, corrosion resistance, and wear resistance. Furthermore, with the gas seal piston ring of the present invention, the initial scuffing phenomenon does not take place because the piston ring has an oxide film formed on the surfaces in contact with the cylinder wall.

What is claimed is:

1. A piston ring for use in a cylinder of an internal combustion engine, comprising:
   a base ring including an exterior edge adapted to slide along the wall of the cylinder;
   a nitrided layer formed in said exterior edge; and
   a oxide film formed over said nitrided layer.

2. A piston ring according to claim 1, wherein said oxide film is a phosphate film.

3. A piston ring according to claim 2, wherein said phosphate film is made of manganese phosphate.

4. A piston ring according to claim 2, wherein said phosphate film is made of zinc phosphate.

5. A piston ring according to claim 1, wherein said oxide film is triion tetroxide.

6. A piston ring according to claim 1, wherein said base ring is made of stainless steel.

7. A piston ring according to claim 1, wherein said nitrided layer comprises a diffusion layer having a hardness greater than the hardness of the material of said base ring and an exterior compound layer having a hardness greater than the hardness of said diffusion layer.

8. A piston ring according to claim 7, wherein said compound layer has been removed and said oxide film is applied directly to said diffusion layer.

* * * * *